T. R. WEYMOUTH.
CALCULATOR.
APPLICATION FILED FEB. 15, 1916.
1,205,068.
Patented Nov. 14, 1916.
4 SHEETS—SHEET 2.
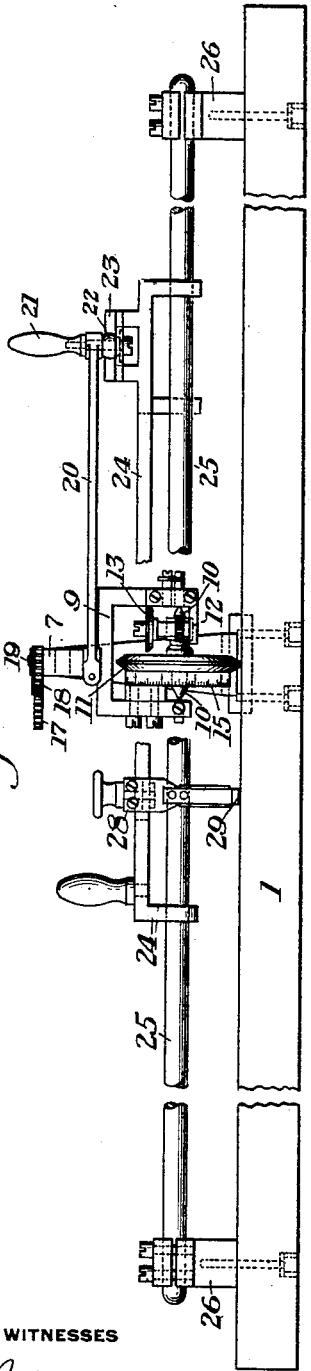
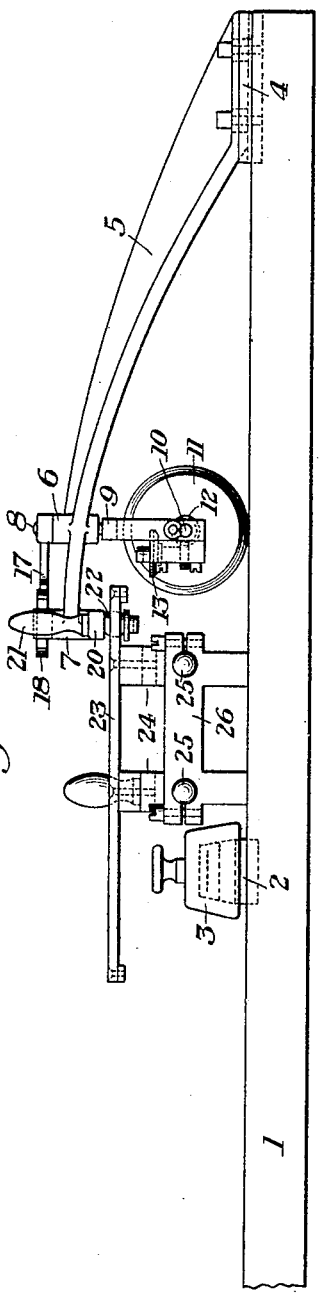
WITNESSES
INVENTOR
Thos. R. Weymouth

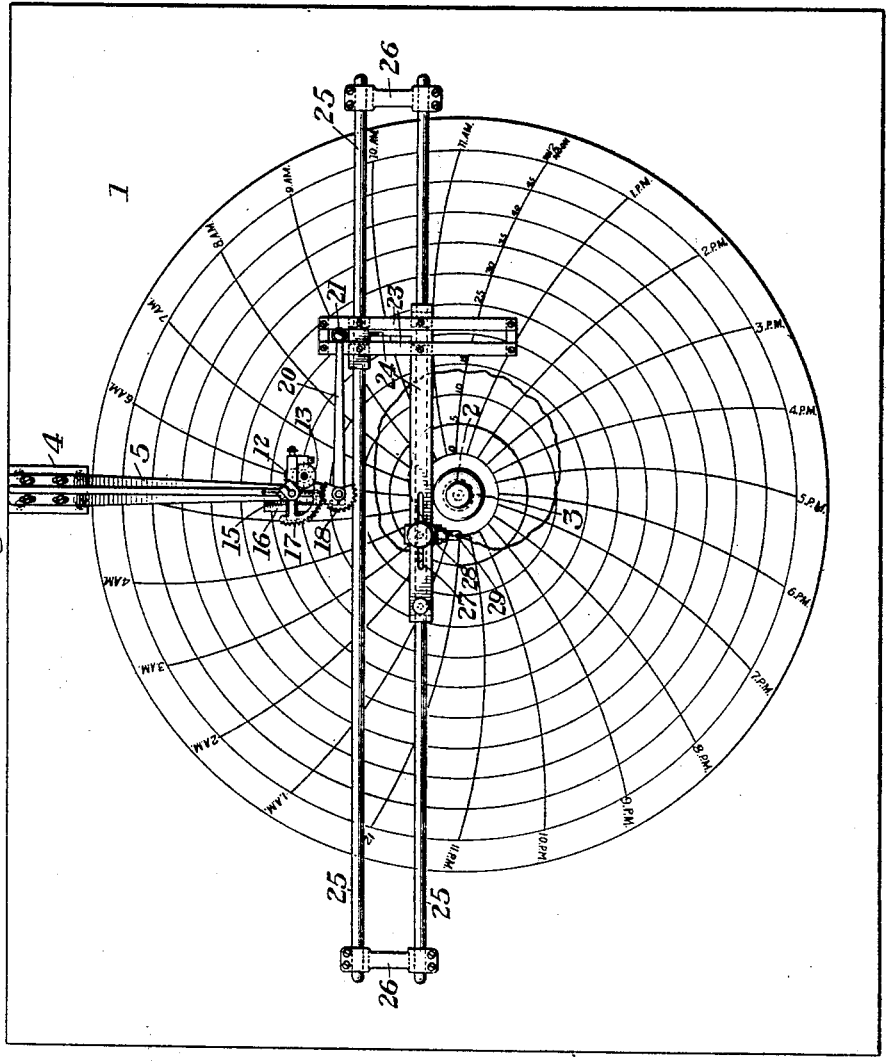

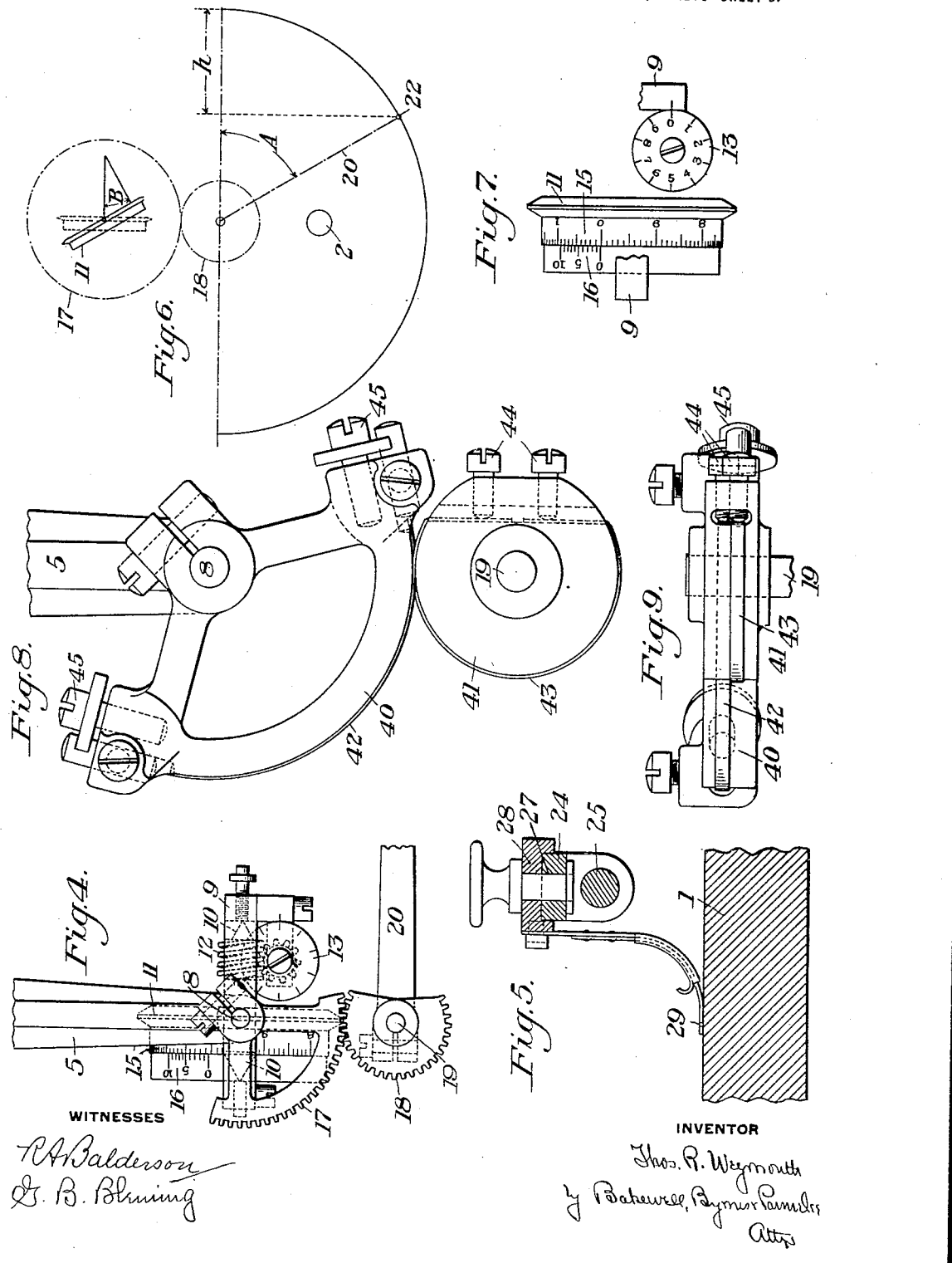

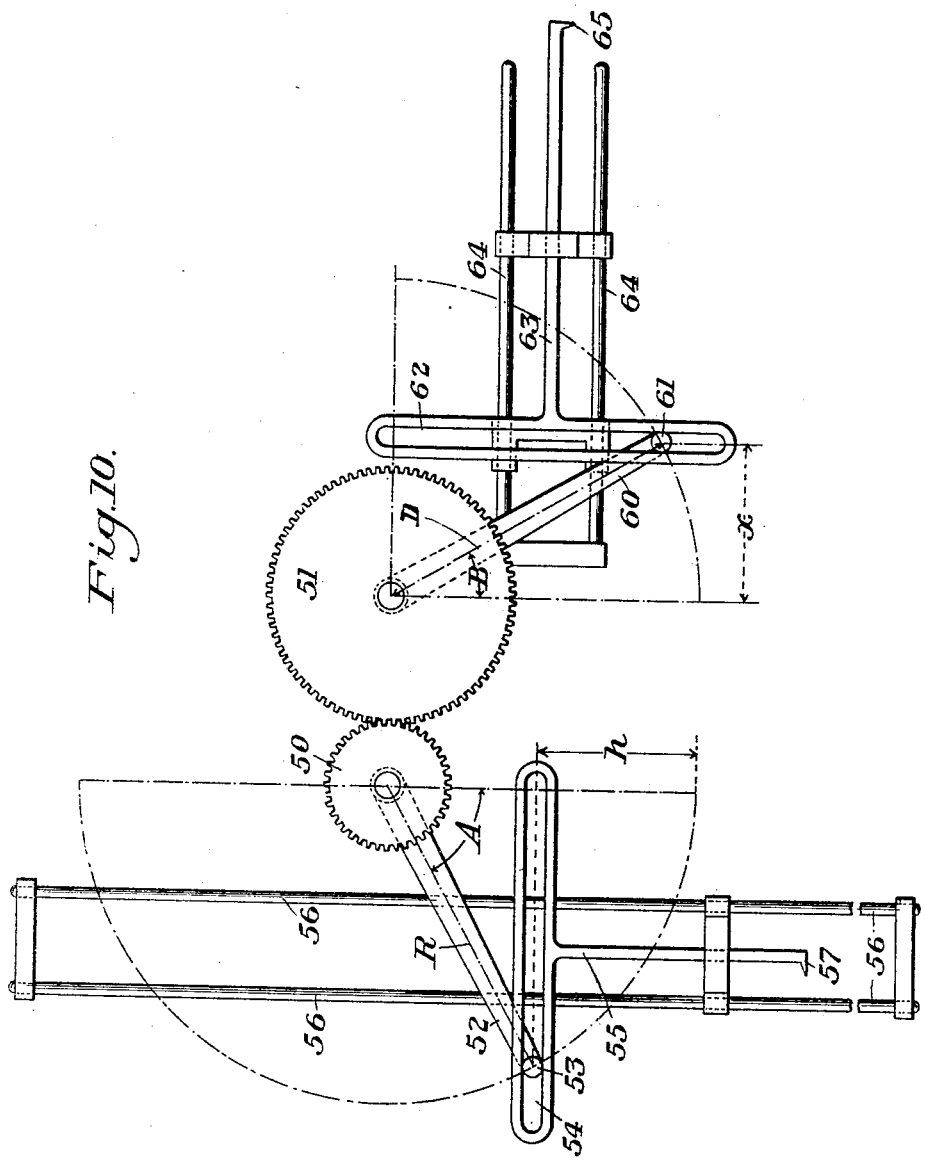

UNITED STATES PATENT OFFICE.

THOMAS R. WEYMOUTH, OF OIL CITY, PENNSYLVANIA.

CALCULATOR.

1,205,068.  Specification of Letters Patent.  Patented Nov. 14, 1916.

Application filed February 15, 1916. Serial No. 78,418.

*To all whom it may concern:*

Be it known that I, THOMAS R. WEYMOUTH, a citizen of the United States, residing at Oil City, in the county of Venango and State of Pennsylvania, have invented a new and useful Improvement in Calculators, of which the following is a full, clear, and exact description, reference being had to the accompanying drawings, forming part of this specification, in which—

Figure 1 is a plan view. Fig. 2 is a front elevation, the centering post being removed. Fig. 3 is a side elevation. Fig. 4 is an enlarged view of the gearing connecting the two rotary members. Fig. 5 is an enlarged sectional view showing the mounting of the tracing point. Fig. 6 is a diagrammatic view indicating the trigonometric relationships involved. Fig. 7 is a detail view showing the tracing wheel, its counting wheel and vernier; Figs. 8 and 9 are a plan view and front elevation respectively of a modification in the connections between the rotary members, and Fig. 10 is a diagrammatic view illustrating a modification.

The present invention relates to a calculator and more particularly to a calculating machine for mechanically calculating square roots or squares.

The invention is particularly applicable to square root integrators to calculate the total flow of some substance, such as gas, from a recording gage chart upon which is drawn a curve of the recorded pressure, the flow being proportional to the square root of the recorded pressure.

The invention is illustrated as embodied in a square root integrator of this type, the preferred construction of which is as follows: On a base or table 1 is mounted a centering post 2 having the same diameter as the center hole of the usual paper gage chart to be measured. The chart is placed on this table centered by the post and revolved around it by hand. A cap 3 fits over the tapered top of the post and serves to hold the chart close to the table during the measuring process, but it is readily removed for changing the charts on the instrument. On one edge of the table is mounted a rectangular block 4 having a slotted guide in its top the center line of which passes through the center of the centering post 2. In this slotted guide is adjustably mounted a bracket arm 5 having at its free end two bearings 6 and 7 with their axes perpendicular to the plane of the table 1 and in the same vertical plane as the centering post and the slot in the guide block 4. In the bearing 6 is mounted a rotatable member or shaft 8 on the lower end of which is attached a yoke 9 containing adjustable trunnion bearings 10, 10, for a sharp edged tracing wheel 11 which is frictionally driven by the chart beneath it. The axle of this wheel has on it a single pitch worm 12 meshing with a ten tooth worm gear which is attached to the spindle of a graduated disk 13 which makes one revolution for every ten revolutions of the tracing wheel 11. The tracing wheel 11 is provided with a circumferential scale 15 registering against a vernier 16 which is mounted on the yoke 9. Thus the revolutions of the tracing wheel 11 are accurately indicated to a one thousandth of one revolution.

The wheel 11 rests on the chart being measured so that when the chart is turned about the centering post 2, the wheel will be caused to revolve at a rate depending upon its distance from the chart center and also upon the angularity between the axis of rotation of the wheel and the direction of movement of the chart past the wheel, or in other words, between the plane of the wheel and the vertical plane in which lie the axes of the shaft 8 and the centering post 2. The wheel 11 is so mounted that the axis of the shaft 8 extended will pass through the point at which the tracing edge of the wheel bears upon the surface of the chart. The axis of the wheel 11 is of course parallel to the surface of the table 1.

On the upper end of the shaft 8 is mounted a quadrant gear 17 meshing with the pinion 18 carried by the shaft 19. The diameter of the gear 17 is twice as great as that of the gear 18. The shafts 19 and 8 thus form rotatable members so connected by the gears 18 and 17 that the shaft 19 is constrained to have twice the angular movement of the shaft 8. The shaft 19 is rotatably mounted in the bearing 7 and has mounted on its lower end a lever arm 20. At the free end or head of the lever is mounted a thumb-hold 21 and a ball pin 22. The ball pin 22 fits closely between guides 23, the center line between which is parallel to the vertical plane cutting the axis of the shaft 8 and the center of the centering post 2.

The guides 23 are mounted on a reciprocating slide 24 which is constrained to move in a direction at right angles to the vertical plane passing through the axis of the shaft 8 and the center of the centering post 2, by means of supporting guide rods 25 carried on end supports 26.

The sliding frame 24 is provided with a slot 27 in which is clamped an adjustable clip 28 for a transparent piece of celluloid having an indicating or tracing point 29 which rests on the chart and is adapted to be moved to follow the chart curve as the chart is revolved. The tracing point 29 moves in a line extending radially outward from the center of the chart and has its zero position adjusted to correspond to the zero line on the chart, so that the displacement of the tracing point 29 serves as a measurement of the instantaneous value of the curve. In charts used for rate flow meters, this measurement is usually that of the instantaneous pressure recorded. When the tracing point 29 moves away from the zero line of the chart, the frame 24 which carries the tracing point 29 and also the guides 23, likewise move an equal distance in the same direction. This causes the arm 20 to turn about the axis of the shaft 19 in a clock-wise direction, and by means of the gears 18 and 17 causes the yoke of the tracing wheel to revolve about the axis of the shaft 8 through just half the angle through which the arm 20 turns.

When the chart is turned about the center post 2, it causes the tracing wheel to revolve an amount depending on the angularity between the direction of movement of the chart beneath the wheel and the axis of rotation of the wheel. This is equal to the angular displacement of the shaft 8 which is one-half the angular displacement of the shaft 19, which is dependent upon the displacement of the tracing point 29 from its zero position.

The trigonometric relationships involved are indicated diagrammatically in Fig. 6. In Fig. 6 are indicated the outlines of the gears 17 and 18. The position of the arm 20 is indicated after it is turned through the angle A. The corresponding position of the tracing wheel 11 is indicated in full lines, the zero position of the tracing wheel being indicated in dotted lines. At 22 is indicated the ball pin which slides in the guides 23 and which therefore has the component of its movement in the direction of the guide rods 25 equal to the movement of the tracing point 29. This movement or displacement of the tracing point 29 is equal to the distance $h$ on the diagram. The distance $h$ is proportional to $1-\cos. A$. When the arm 20 is turned through the angle A, the wheel 11 is angularly displaced about the axis of the shaft 8 by an angle $B=\frac{1}{2}A$. When the paper chart is turned about the centering post, it frictionally drives the wheel 11. For a given movement of the chart beneath the wheel, the wheel 11 will be turned about its own axis through an angle proportional to sine B and therefore proportional to the sine of one-half A. If M equals the increment of the rotary movement of the wheel about its own axis for a certain increment in the movement of the chart beneath the wheel, then $M=K' \sin. \frac{1}{2}A$. From the trigonometric formula we have $$\sin. \tfrac{1}{2}A = \sqrt{\tfrac{1}{2}(1-\cos. A)}$$

Therefore:

$$M = K' \sin. \tfrac{1}{2}A = K'\sqrt{\tfrac{1}{2}(1-\cos. A)}$$

However, $h$ is proportional to $$1-\cos. A \text{ or } h = K''(1-\cos. A)$$

Hence:

$$M = K'\sqrt{\frac{1}{2K''}h} = K\sqrt{h}$$

where K, K' and K'' are constants of proportionality.

In other words, the rotary movement or measurement indicated by the reading of the wheel 11 is proportional to the square root of the distance of the tracing point 29 from its zero position. Thus by moving the tracing point 29 to trace the record line of the chart and by using the multiplying factor of the instrument, depending upon the graduating of the chart being measured, it is possible to ascertain from the reading of the wheel 11 the summation of the instantaneous square root values of the indications of any record line drawn on the chart.

In Figs. 8 and 9 is illustrated a modification of the means for connecting the shafts 8 and 19. Instead of the gears 17 and 18, the band wheels 40 and 41 are employed. The band wheels are connected by flexible steel bands 42 and 43. The bands may be adjusted by clamping screws 44 and tightening screws 45, which are arranged at the ends of each band. By adjusting the bands the zero positions of the two wheels 40 and 41 may be accurately correlated. The band wheels also have an advantage in that they are free from back-lash. The function of the band wheels is the same as that of the gears, namely, to give a two to one ratio between the angular movements of the shafts 19 and 8.

It is obvious that other modifications may be made in the apparatus.

The instrument forming the illustrated embodiment of the invention is adapted for office use in a manner similar to the planimeter. The mechanism for effecting the square root relation between the one measuring device (illustrated as the indicating point 29) and another measuring device (illustrated as the wheel 11) may be obviously employed for other purposes. For example, the mechanism may be adapted to be attached to a recording gage with the chart operated by clock-work, and the indicating or tracing point actuated by the pressure, and thus constitute an integrating instrument for rate flow meters in which the flow is proportional to the square root of the pressure. By the addition of a second guide similar to 23 attached to a carrier like the carrier 24 and engaging a pin carried on the end of a lever arm extending radially from the shaft 8, the reciprocating movement of such a guide and carrier would be proportional to the square root of the reciprocating movement of the tracing point 29, or conversely, the reciprocating movement of the tracing point will be proportional to the square of the movement of such guide. Such an arrangement is illustrated diagrammatically in Fig. 10, in which there are two meshing gear wheels 50 and 51 having a 1 to 2 gear ratio. The gear wheel 50 is provided with an arm 52, which carries a pin 53 working in a slot 54 which is carried on a carrier 55 arranged to reciprocate along guides 56. The carrier 55 has any suitable indicating pointer, such as 57. The gear wheel 51 likewise carries an arm 60 provided with a pin 61 which works in a slot 62 which is mounted on a carrier 63. The carrier 63 is mounted to reciprocate on guides 64. The carrier 63 is provided with any suitable pointer, such as 65. The illustrated arrangement is such that the movement of displacement of the pointer 65 is proportional to the square root of the movement or displacement of the pointer 57; or conversely, the movement or displacement of the pointer 57 is proportional to the square of the movement or displacement of the pointer 65. The arrangement illustrated is intended to be diagrammatic only, and it is obvious that instead of the pointers 57 and 65, the sliding carriers 55 and 63 might be attached to other kinds of indicating or recording devices, the arrangement in Fig. 10 being intended to diagrammatically illustrate one of the modifications embodying the invention, broadly considered, namely, an arrangement whereby the movement or displacement of one member is made to correspond to the square or the square root of the movement or displacement of a second member.

The relation shown in Fig. 10 may be mathematically expressed similarly to that shown in Fig. 6. Let R be the length of the arm 52 and D the length of the arm 60. Let A and B be equal to the angular displacements of the two arms 52 and 60, respectively. Let $h$ be the corresponding longitudinal displacement of the carrier 55 and pointer 57, and let $x$ be the corresponding longitudinal displacement of the carrier 63 and pointer 65. Then $$h = R(1 - \cos. A)$$
$$x = D \sin. B = D \sin. \frac{A}{2}$$

But $$\sin. \frac{A}{2} = \sqrt{\frac{1 - \cos. A}{2}}$$

And $$\frac{1 - \cos. A}{2} = \frac{h}{2R}$$

Hence $$\sin. \frac{A}{2} = \sqrt{\frac{h}{2R}} = \frac{\sqrt{h}}{\sqrt{2R}}$$

And $$x = D \sin. \frac{A}{2} = \frac{D\sqrt{h}}{\sqrt{2R}} = K\sqrt{h}$$

where K is a constant of proportionality. Hence, the displacement $x$ of the pointer 65 is proportional to the square root of the displacement $h$ of the pointer 57.

If the length D of the arm 60 be equal to the square root of 2R, that is, equal to the square root of twice the length of the arm 52, the constant K becomes unity and the displacement $x$ of the pointer 65 is directly equal to the square root of the displacement $h$ of the pointer 57.

It is obvious that many other mechanical arrangements may be made to embody the invention, within the scope of the claims.

The invention is therefore not limited to its illustrated embodiment, but may be employed in other constructions within the scope of the following claims.

I claim:

1. A calculating machine comprising two rotatable members so connected that the first member is constrained to have twice the angular movement of the second member, a measuring device so connected with the first member as to have its operation proportional to one minus the cosine of the angular displacement of the first rotatable member, and a second measuring device so connected with the second member as to have its operation proportional to the sine of the angular displacement of the second member, whereby a square root factor of proportionality exists between the operation of the second and the first measuring devices.

2. A calculating machine comprising two rotatable members so connected that the first member is constrained to have twice the angular movement of the second member, a measuring device connected with the first member to have its position so dependent on the position of the first member that its readings are proportional to one minus the cosine of the angular displacement of the first member, and a second measuring device connected with the second member as to have its position so dependent on the position of the second member that its readings are proportional to the sine of the angular displacement of the second member, and thereby proportional to the square root of the readings of the first measuring device.

3. A calculating machine comprising two rotatable members so connected that the first member is constrained to have twice the angular movement of the second member, a measuring device and its connections with the first rotatable member including a reciprocating slide, and an indicator carried thereby, and an arm on the first member having a head engaged by the slide and free to move transversely thereof, whereby the displacement of the indicator is proportional to one minus the cosine of the angular displacement of the first rotary member, and a second measuring device controlled by the second rotary member.

4. A square root integrator comprising a table for holding a chart, a tracing point arranged to follow the curve of the chart which is to be integrated, and a tracing wheel arranged to be frictionally driven by the chart and so connected with the tracing point that the rotary movement imparted to the wheel is proportional to the square root of the measurement of the tracing point.

5. A square root integrator comprising a table adapted to rotatably support a circular chart, a tracing point movable over the chart and arranged to follow the curve to be integrated, and a tracing wheel frictionally driven by the chart as it is moved and connections between the tracing wheel and tracing point such that the readings as recorded by the tracing wheel are proportional to the summation of the instantaneous square root values of the measurements made by the tracing point.

6. A square root integrator comprising a table for movably supporting a chart on which is a curve to be integrated, a tracing point movable with respect to the chart and arranged to follow the curve, a rotary member so connected with the tracing point that the displacement of the point is proportional to one minus the cosine of the angular displacement of the rotary member, a second rotary member so connected with the first member that it is constrained to have one half the angular movement of the first member, a tracing wheel arranged to be frictionally driven by the movement of the chart and so connected with the second rotary member that the movement imparted to the wheel by the chart is proportional to the sine of the angular displacement of the second rotary member, whereby the movement of the tracing wheel is proportional to the square root of the measurement indicated by the tracing point.

7. A square root integrator comprising a table for rotatably holding a chart upon which is a curve to be integrated, a reciprocating slide carrying a tracing point movable over the chart to follow the curve and measure the instantaneous values thereof, a rotary member connected with the slide so that the displacement of the tracing point is proportional to one minus the cosine of the displacement of the rotatable member, a second rotatable member connected with the first member by gearing or the like to have one half the angular movement of the first member, and a tracing wheel resting on and frictionally driven by the movement of the chart and connected with the second rotatable member to have the angle between its axis and the direction of movement of the chart pass the wheel the same as the angular displacement of the second member.

In testimony whereof I have hereunto set my hand.

THOS. R. WEYMOUTH.

Witnesses:
F. B. TROSH,
GEO. YARDLEY.

Copies of this patent may be obtained for five cents each, by addressing the "Commissioner of Patents, Washington, D. C."